US009604668B2

(12) United States Patent
Storey

(10) Patent No.: US 9,604,668 B2
(45) Date of Patent: Mar. 28, 2017

(54) CONTROL SYSTEM FOR SWITCHING TRACTION DEVICE INPUTS

(71) Applicant: Caterpillar Forest Products Inc., Peoria, IL (US)

(72) Inventor: Joseph R. Storey, Newnan, GA (US)

(73) Assignee: Caterpillar Forest Products Inc., Peoria, IL (US)

( * ) Notice: Subject to any disclaimer, the term of this patent is extended or adjusted under 35 U.S.C. 154(b) by 185 days.

(21) Appl. No.: 14/330,169

(22) Filed: Jul. 14, 2014

(65) Prior Publication Data

US 2016/0009316 A1 Jan. 14, 2016

(51) Int. Cl.
| B62D 11/00 | (2006.01) |
| B60K 31/00 | (2006.01) |
| E02F 9/20 | (2006.01) |
| E02F 3/413 | (2006.01) |
| E02F 3/96 | (2006.01) |
| E02F 9/12 | (2006.01) |
| E02F 9/22 | (2006.01) |

(52) U.S. Cl.
CPC ........... *B62D 11/001* (2013.01); *B60K 31/00* (2013.01); *E02F 3/4135* (2013.01); *E02F 3/962* (2013.01); *E02F 9/123* (2013.01); *E02F 9/2012* (2013.01); *E02F 9/225* (2013.01); *B60K 2031/0091* (2013.01)

(58) Field of Classification Search
CPC ... B62D 11/001; B62D 11/003; B62D 11/005; B62D 11/006; B62D 11/008; B62D 33/073; A61G 5/1072; E02F 9/123; E02F 9/225; E02F 9/2012

USPC ............................................. 180/6.6; 701/41
See application file for complete search history.

(56) References Cited

U.S. PATENT DOCUMENTS

| 3,357,509 A | 12/1967 | Gustafsson et al. |
| 3,774,707 A | 11/1973 | Bridwell et al. |
| 3,990,527 A | 11/1976 | Inui et al. |
| 4,163,413 A | 8/1979 | Kennicutt |
| 4,841,841 A | 6/1989 | Redelman et al. |
| 4,951,766 A * | 8/1990 | Basedow ............... A61G 5/042 180/329 |
| 5,285,861 A | 2/1994 | Nakamura |
| 5,482,138 A * | 1/1996 | Mori ....................... E02F 9/00 184/6 |
| 6,148,939 A | 11/2000 | Brookhart et al. |
| 6,684,969 B1 * | 2/2004 | Flowers ................. A61G 5/042 180/316 |

(Continued)

*Primary Examiner* — Emma K Frick

(57) ABSTRACT

The present disclosure is directed to a control system for a machine having first and second traction devices and a cabin. The control system has a first actuator driving the first traction device and a first interface device to generate a first input indicating a desired movement of the first actuator. The control system also has a second actuator driving the second traction device and a second interface device to generate a second input indicating a desired movement of the second actuator. The control system has a controller that causes the first actuator to operate according to the first input and the second actuator to operate according to the second input when the cabin faces a first direction. The controller also causes the first actuator to operate according to the second input and the second actuator to operate according to the first input when the cabin faces a second direction.

10 Claims, 4 Drawing Sheets

(56) References Cited

U.S. PATENT DOCUMENTS

| | | | |
|---|---|---|---|
| 8,251,162 B2* | 8/2012 | Kim | B62D 11/005 |
| | | | 180/6.48 |
| 8,985,263 B2* | 3/2015 | Peterson | E21F 13/025 |
| | | | 180/317 |
| 9,132,855 B2* | 9/2015 | Bertsch | B62D 11/003 |
| 2008/0119985 A1* | 5/2008 | Schubitzke | B62D 11/001 |
| | | | 701/41 |
| 2009/0198414 A1 | 8/2009 | Mohning et al. | |

\* cited by examiner

CONTROL SYSTEM FOR SWITCHING TRACTION DEVICE INPUTS

TECHNICAL FIELD

The present disclosure generally relates to a control system, and more particularly, to a control system for switching traction device inputs.

BACKGROUND

Machines used in earth moving, mining, construction, forestry, or similar applications have an upper frame rotatably mounted to a lower frame. The lower frame of such a machine often includes a track assembly, which has a track on a left side and a track on a right side of the machine. An operator of the machine can independently control the left and right tracks, which cooperate to propel the machine in a desired direction. To propel the machine in the forward direction, the operator may use a right travel pedal to actuate the right track and a left travel pedal to actuate the left track. Specifically, the operator can use the right travel pedal to speed up or slow down the right track, and similarly use the left travel pedal to speed up or slow down the left track.

The operator can rotate the upper frame by 180° or more while maintaining the lower frame in its original position. In this configuration, the right track is located on the operator's left side and the left track is located on the right side of the operator. When the operator pushes on either of the pedals, an act intuitively associated with moving forward, the machine actually travels in the reverse direction. Operating the machine in this situation may become counter-intuitive and may pose mental strain on the operator.

One way to overcome this problem consists of rotating the lower frame of the machine without altering the relative positions of the upper and lower frame, effectively turning the whole machine around. In certain applications, however, geographic and/or space constraints may prevent the operator from turning the machine around. For example, in swamp logging operations, turning the whole machine can tear and damage the underlying surface due to the inherent instability of the terrain. In other situations, narrow and/or restricted workspaces may constrain the machine allowing it only to move in a forward or rearward direction.

One attempt to address some of the problems described above is disclosed in United States Patent Application Publication No. U.S. 2008/0119985 of Schubitzke that published on May 22, 2008 ("the '985 publication"). In particular, the '985 publication discloses a control system for a rotating turret vehicle having steering controls in the turret, wherein the steering controls may be reversed when the turret faces the rear of the vehicle. The disclosed system of the '985 publication uses directional valves and valve matrices to reroute the hydraulic fluids from one side of the vehicle to the other in order to reverse the steering controls.

Although the '985 publication discloses a system for reversing the steering controls based on a turret position, the system of the '985 publication may still be problematic. For example, the disclosed system uses directional valves and valve matrices to route the hydraulic fluids. This configuration may involve increased cost of implementation and operation and longer reaction times due to the complexities of hydraulic fluid switching.

The control system for switching traction device inputs of the present disclosure solves one or more of the problems set forth above and/or other problems in the art.

SUMMARY

In one aspect, the present disclosure is directed to control system for a machine having first and second traction devices and a cabin capable of rotating relative to the first and second traction devices. The control system includes a first actuator configured to drive the first traction device and a first interface device configured to generate a first input indicative of a desired movement of the first actuator. The control system also includes a second actuator configured to drive the second traction device and a second interface device configured to generate a second input indicative of a desired movement of the second actuator. In addition, the control system includes a controller in communication with the first and second actuators and the first and second interface devices. The controller is configured to cause the first actuator to operate in accordance with the first input and the second actuator to operate in accordance with the second input when the cabin is facing a first direction. The controller is also configured to cause the first actuator to operate in accordance with the second input and the second actuator to operate in accordance with the first input when the cabin is facing a second direction.

In another aspect, the present disclosure is directed to a method of operating a machine having first and second traction devices, first and second interface devices, and a cabin capable of rotating relative to the first and second traction devices. The method includes receiving a first input from the first interface device, receiving a second input from the second interface device. The method also includes propelling the first traction device based on the first input and the second traction device based on the second input when the cabin faces a first direction. The method further includes propelling the first traction device based on the second input and the second traction device based on the first input when the cabin faces a second direction.

DETAILED DESCRIPTION

Figure 1:
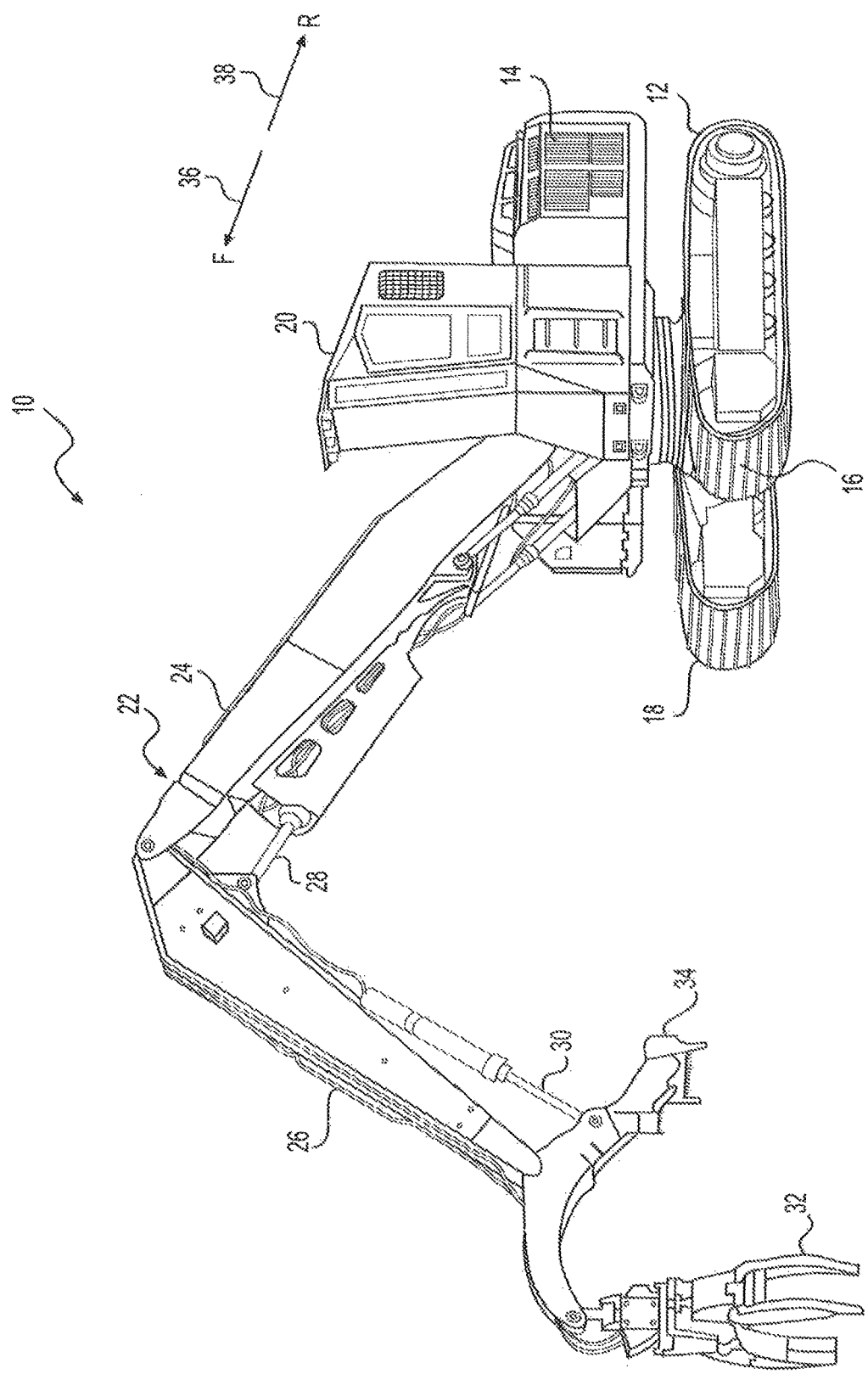
FIG. 1 is a pictorial illustration of an exemplary disclosed machine.

FIG. 1 illustrates an exemplary embodiment of a machine 10. Machine 10 may be a mobile machine that performs some type of operation associated with an industry such as logging, mining, construction, farming, transportation, or another industry known in the art. For example, as shown in FIG. 1, machine 10 may be a forestry machine, feller buncher, or harvester equipped with grapples and heels and having multiple systems and components that cooperate to accomplish a task.

Machine 10 may include a lower frame 12 and an upper frame 14. Lower frame 12 may include first traction device 16 and second traction device 18 that may be cooperatively operated to propel machine 10 in a desired direction. In one exemplary embodiment as illustrated in FIG. 1, first and second traction devices 16, 18 may be tracks. Upper frame 14 may include a cabin 20 and an arm 22 that includes a first member 24 operatively coupled to a second member 26. Upper frame 14 may be rotated about an axis oriented vertically with respect to lower frame 12. Specifically, upper frame 14 may be rotated by an angle ranging from about 0 to 360 degrees relative to lower frame 12.

First member 24 and second member 26 may be supported and powered by hydraulic cylinders 28 and 30, respectively. One or more tools 32, 34 may be attached to second member 26. Tools 32, 34 may be cooperatively operated to perform a task, as desired by an operator (not shown) located in cabin 20. First member 24, second member 26, and tools 32, 34 may also be rotated with upper frame 14. It is contemplated that an operator may decide to rotate the entire machine 10, and not just upper frame 14. In other words, machine 10 may be operated to allow lower frame 12 and upper frame 14 to move together.

In one exemplary operating condition, cabin 20 may face a first direction 36. In this operating condition, first traction device 16 may be located on the left side of an operator in cabin 20 and second traction device 18 may be located on the right side of the operator. In this operating condition, control of machine 10 may be intuitive because a first pedal (not shown) that the operator uses to control first traction device 16 may be on the left side of the operator, i.e. on the same side as first traction device 16. Similarly, a second pedal (not shown) that the operator uses to control second traction device 18 may be on the right side of the operator, i.e. on the same side as second traction device 18.

In another exemplary operating condition, upper frame 14 may be rotated by 180 degrees relative to lower frame 12 so that cabin 20 may face a second direction 38. In this operating condition, first traction device 16 may be located on the right side of the operator in cabin 20 and second traction device 18 may be located on the left side of the operator in cabin 20. In this operating condition, control of machine 10 may be counter-intuitive because the first pedal that controls first traction device 16 may no longer be on the same side as first traction device 16 and similarly, the second pedal that controls second traction device 18 may no longer be on the same side as second traction device 18.

Figure 2:
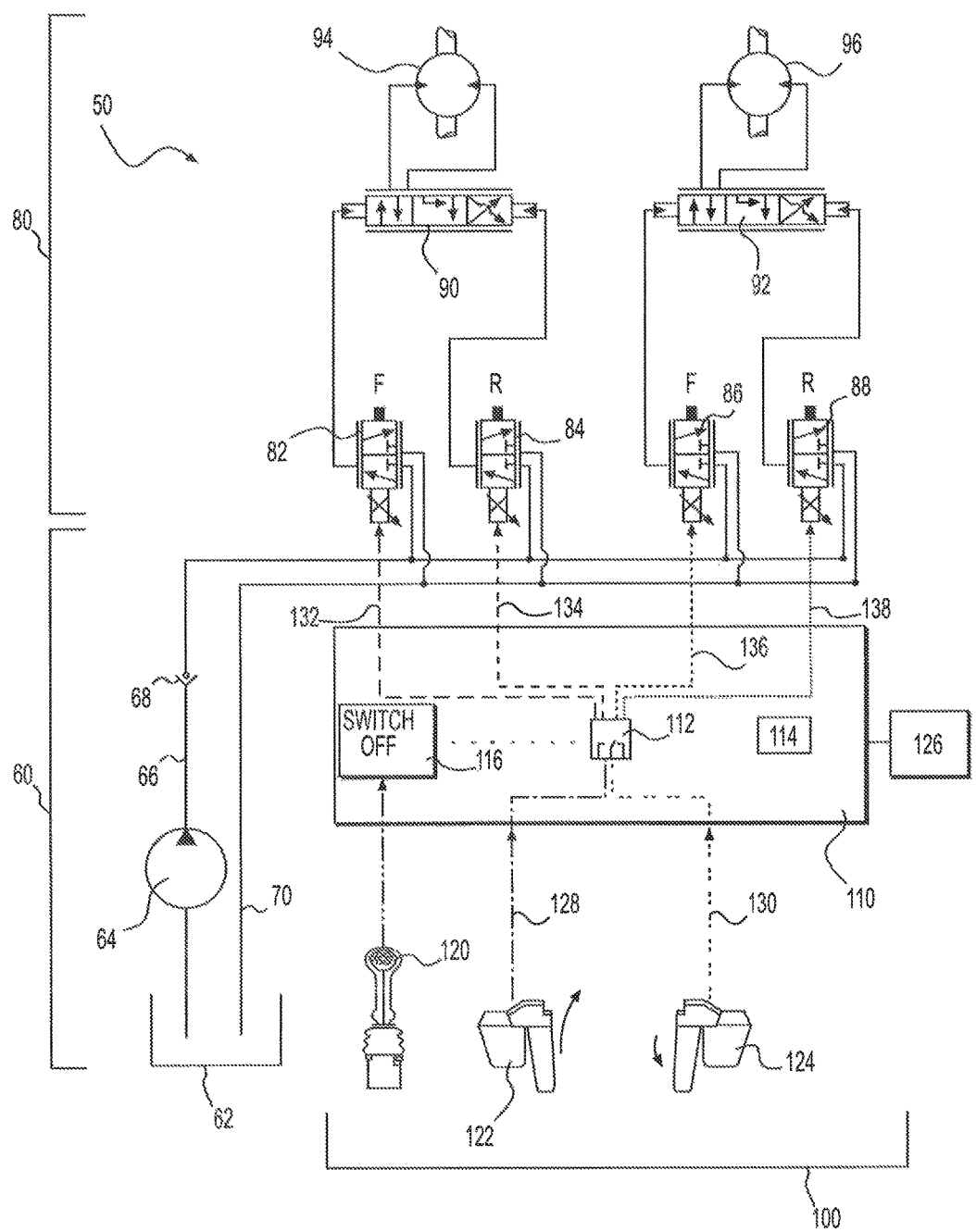
FIG. 2 is a schematic of an exemplary disclosed configuration of a control system for switching traction device inputs for the machine of FIG. 1.

FIG. 2 illustrates a control system 50, according to an exemplary embodiment. Control system 50 may include a fluid circulation system 60, an actuator system 80 and an input switching system 100. Fluid circulation system 60 may include a tank 62, which may store hydraulic fluid. Fluid circulation system may also include a pump 64, which may draw hydraulic fluid from tank 62, pressurize the hydraulic fluid, and direct the pressurized hydraulic fluid to actuator system 80 via passageway 66. A check valve 68 may be disposed in passageway 66 to prevent flow of pressurized hydraulic fluid back to pump 64. Hydraulic fluid from actuator system 80 may be directed back to tank 62 via passageway 70. Although, FIG. 2 illustrates only one tank 62, one pump 64 and one check valve 68, fluid circulation system 60 may include any number of tanks 62, pumps 64, and/or check valves 68. It is also contemplated that fluid circulation system 60 may include filters, control valves, relief valves, or any other components for circulating hydraulic fluid known in the art.

Actuator system 80 may include solenoid valves 82, 84, 86, 88, directional valves 90, 92 and first and second actuators 94, 96. As illustrated in FIG. 2, solenoid valves 82, 84, 86, and 88 may be coupled to passageway 66 of fluid circulation system 60 to receive pressurized hydraulic fluid. Solenoid valves 82, 84, 86, and 88 may also be coupled to passageway 70 to allow hydraulic fluid to return to tank 62. Further, solenoid valves 82, 84 may be coupled to directional valve 90 that may be configured to drive first actuator 94. Solenoid valves 86, 88 may be coupled to directional valve 92 that may be configured to drive second actuator 96. In one exemplary embodiment, first actuator 94 may be used to propel first traction device 16 (see FIG. 1) and second actuator 96 may be used to propel second traction device 18 (see FIG. 1).

Solenoid valve 82 may be an independent metering valve configured to meter pressurized fluid into and out of directional control valve 90 based on a command from controller 110 (i.e., when energized by controller 110). In the disclosed embodiment, solenoid valve 82 may include a single valve element movable between a first position at which fluid from pump 64 may be directed into solenoid valve 82 via a supply passage connected to passageway 66, and a second position at which fluid from solenoid valve 82 may return to tank 62 via passageway 70. The valve element of solenoid valve 82 may be moved to the first position when solenoid valve 82 is energized by controller 110 (i.e. when an electrical current is directed to solenoid valve 82), and spring-biased to the second position when solenoid valve 82 is de-energized (i.e. when no current is supplied to solenoid valve 82). It is contemplated that solenoid valve 82 may alternatively include multiple valve elements that together or separately control the flows of fluid into and out of solenoid valve 82, if desired. Although FIG. 2 illustrates two solenoid valves 82, 84 controlling directional control valve 90, it is contemplated that control system 50 may have only one solenoid valve 82 or 84 which may control first actuator 94. Similarly, although FIG. 2 illustrates two solenoid valves 86, 88 controlling directional control valve 92, it is contemplated that control system 50 may have only one solenoid valve 86 or 88 which may control second actuator 96.

First and second actuators 94, 96 may be hydraulic motors configured to rotate in the first and second angular directions. It is contemplated, however, that first and second actuators may be electric motors or any other type of rotational actuators known in the art. When solenoid valve 82 is energized, solenoid valve 82 may be configured to direct pressurized hydraulic fluid from passageway 66 to directional control valve 90. Directional control valve 90 may direct the fluid to first actuator 94, which may rotate in a first angular direction. By rotating in the first angular direction, first actuator 94 may cause first traction device 16 to be propelled in a forward direction. In one exemplary embodiment, as illustrated in FIG. 1, forward direction may be a direction collinear with first direction 36. When solenoid valve 82 is de-energized, however, solenoid valve 82 may be configured to direct hydraulic fluid from directional control valve 90 to passageway 70. Solenoid valves 84, 86, and 88 may have a structure and function similar to that of solenoid valve 82.

Solenoid valve 84 may be configured to provide drive power to actuator 94 in a manner similar to that of solenoid valve 82. For example, when solenoid valve 84 is energized, solenoid valve 84 may be configured to direct pressurized hydraulic fluid from passageway 66 to directional control valve 90. Directional control valve 90 may direct the fluid to first actuator 94, which may rotate in a second angular direction opposite the first angular direction. By rotating in the second angular direction, first actuator 94 may cause first traction device 16 to be propelled in a rearward direction. In one exemplary embodiment, as illustrated in FIG. 1, the rearward direction may be a direction collinear with second direction 38.

Solenoid valve 86 and directional valve 92 may be configured to provide drive power to actuator 96 in a manner similar to that discussed above with respect to solenoid valve 82. Similarly, solenoid valve 88 and directional valve 92 may be configured to provide drive power to actuator 96 in a manner similar to that discussed above with respect to solenoid valve 84.

Input switching system 100 may include controller 110, selector 120, first interface device 122, second interface device 124, and proximity sensor 126. Controller 110 may include processor 112, storage device 114, and switch 116. Various other known devices may be associated with controller 110, including power supply circuitry, signal-conditioning circuitry, actuator driver circuitry (i.e., circuitry powering solenoids, motors, or piezo actuators), communication circuitry, and other appropriate circuitry.

Processor 112 of controller 110 may embody a single microprocessor or multiple microprocessors, field programmable gate arrays (FPGAs), digital signal processors (DSPs), etc. that include a means for receiving inputs from selector 120, first interface device 122, and second interface device 124 and for controlling the operation of solenoid valves 82, 84, 86, 88 and directional control valves 90, 92. Numerous commercially available microprocessors can be configured to perform the functions of processor 112. One skilled in the art would appreciate that processor 112 could readily embody a microprocessor separate from that controlling other machine functions, or that processor 112 could be integral with a general machine control system microprocessor and be capable of controlling numerous machine system functions and modes of operation. If separate from a machine control system microprocessor, processor 112 may communicate with the general machine control system microprocessor via data links or other methods.

Storage device 114 may include Random Access Memory (RAM) devices, NOR or NAND flash memory devices, Read Only Memory (ROM) devices, hard drives, solid state drives etc. Storage device 114 may be configured to store data or one or more instructions and/or software programs that perform functions or operations when executed by processor 112. Furthermore, storage device 114 may be co-located with processor 112 or it may be communicatively coupled to controller 110 and/or processor 112 via wired and/or wireless networks. Although FIG. 2 illustrates only one processor 112 and only one storage device 114, controller 110 may include any number of processors 112 and storage devices 114.

Switch 116 may be coupled to processor 112 and storage device 114 and may be configured to determine how controller 110 controls the operation of first and second actuators 94, 96. Switch 116 may be a button, a knob, a slider, a lever, or a widget on a display or a touch-screen device. Switch 116 may be configured to be in an "OFF" (deactivated) state or in an "ON" (activated) state. Switch 116 may also be connected to a selector 120 which may be configured to activate or deactivate switch 116. Selector 120 may be a joystick, lever, mouse pointer, keyboard, microphone, or any other type of input device known in the art. Although FIG. 2 depicts switch 116 to be co-located with controller 110, switch 116 may be disposed on selector 120 or anywhere else on machine 10.

In one exemplary embodiment, when switch 116 is "OFF," controller 110 may permit an operator to control first traction device 16 using first interface device 122 and to control second traction device 18 using second interface device 124. When switch 116 is "ON," controller may permit the operator to switch inputs to the first and second traction devices 16, 18. That is, when switch 116 is "ON," the operator may control first traction device 16 using second interface device 124 and control second traction device 18 using first interface device 122.

Control system 50 may also include a proximity sensor 126, which may be configured to sense an angular position of a reference portion of upper frame 14 relative to lower frame 12. Proximity sensor 126 may be located on lower frame 12, upper frame 14, or any other portion of machine 10. Proximity sensor 126 may be configured to send a signal to controller 110 upon detecting that upper frame and/or cabin 20 has rotated relative to lower frame 12 by an angle exceeding a threshold angle. Upon receiving the signal from proximity sensor 126, controller 110 may be configured to switch inputs to the first and second traction devices 16, 18 in a manner similar to that discussed above with respect to switch 116. In one exemplary embodiment, the threshold angle may be about 90 degrees.

First interface device 122 and second interface device 124 may be coupled to controller 110 and may be configured to control the operation of first and/or second traction devices 16, 18 via first and second actuators 94, 96. In one exemplary embodiment, as illustrated in FIG. 2, first and second interface devices 122, 124 may be rocker pedals wherein the operator can push on the top of the pedals to propel first and second traction devices 16, 18 in the forward direction or on the bottom of the pedals to propel first and second traction devices 16, 18 in the forward direction. Further, when switch 116 is "ON," the rocker pedal inputs may be switched so that operator may be able to push on the bottom of the pedals to propel first and second traction devices 16, 18 in the forward direction and push on the top of the pedals to propel first and second traction devices 16, 18 in the rearward direction. It is contemplated, however, that first and second interface devices may take other forms such as buttons, levers, knobs, or any other types of actuation devices known in the art.

First and second interface devices 122 and 124 may provide drive power to first and second actuators 94 and 96. Activating first interface device 122, for example, by pressing first interface device 122, when first interface device 122 is a pedal, may generate a first input to controller 110. In one exemplary embodiment, first input may be an electrical current 128. Further, activating first interface device 122 may generate a first signal, which may indicate whether first actuator 94 may rotate in a first or second angular direction. Second interface device 124 may function in a manner similar to first interface device 122. That is, activating second interface device 124 may generate a second input to controller 110. In one exemplary embodiment, second input may be an electrical current 130. Further, activating second interface device 124 may generate a second signal, which may indicate whether second actuator 96 may rotate in a first or second angular direction.

Controller 110 may be configured to direct electrical currents 128, 130 to one or more of solenoid valves 82, 84, 86, 88. Controller 110 may be configured to select one or more of solenoid valves 82, 84, 86, 88 to energize with electrical currents 128, 130 based on whether switch 116 is "ON" or "OFF" and based on whether a first or second signal is generated. Controller 110 may cooperate with other electrical components (not shown) to direct electrical currents 128, 130 to one or more of solenoid valves 82, 84, 86, 88.

FIG. 2 illustrates an exemplary configuration in which switch 116 is in the "OFF" position (deactivated state). When switch 116 is in the OFF position, first interface device 122 may be configured to control first traction device 16 and second interface device 124 may be configured to control second traction device 18. In this configuration, for example, cabin 20 may face first direction 36, first traction device 16 may be located on the left side of an operator in cabin 20, and second traction device 18 may be located on the right side of the operator. Thus, for example, when first and second signals generated by first and second interface devices 122, 124 indicate that the operator desires to propel machine 10 in a forward direction, processor 112 may direct branch current 132 to solenoid valve 82 without energizing solenoid valve 84. Processor 112 may similarly direct branch current 136 to solenoid valve 86 without energizing solenoid valve 88. Upon receiving branch currents 132, 136, solenoid valves 82 and 86, respectively, may be configured to direct pressurized fluid to first and second actuators 94, 96, which may rotate in a first angular direction causing first and second traction devices 16, 18 to be propelled in first direction 36. Hydraulic fluid from first and second actuators 94, 96 may return to tank 62 via the de-energized solenoid valves 84, 88, respectively.

Further, in the configuration of FIG. 2, when first and second signals indicated that the operator desires to move machine 10 in a rearward direction, processor 112 may direct branch current 134 to solenoid valve 84 without energizing solenoid valve 82. Processor 112 may similarly direct branch current 138 to solenoid valve 88 without energizing solenoid valve 86. Upon receiving branch currents 134, 138, solenoid valves 84 and 88, respectively, may be configured to direct pressurized fluid to first and second actuators 94, 96, which may rotate in a second angular direction causing first and second traction devices 16, 18 to be propelled in second direction 38. Hydraulic fluid from first and second actuators 94, 96 may return to tank 62 via de-energized solenoid valves 82, 86, respectively.

It is contemplated that machine 10 may have additional controls for regulating the amplitude and/or any other parameters of electrical currents 128, 130 and branch currents 132, 134, 136, 138. Regulating the amplitude or other parameters associated with electrical currents 128, 130 and/or branch currents 132, 134, 136, 138 may allow an operator to control a speed of first and second traction devices 16, 18. In one exemplary embodiment, controller 110 may limit a magnitude of electrical currents 128, 130 from exceeding a threshold value, thereby limiting the maximum speed at which first and second traction devices 16, 18 may be propelled. In another exemplary embodiment, controller 110 may also limit a magnitude, amplitude, or other parameter associated with branch currents 132, 134, 136, 138 to inhibit first and second actuators 94, 96 from responding to actuation of first and second interface devices 122, 124, when a speed of first and second traction devices 16, 18 exceeds a threshold speed.

Figure 3:
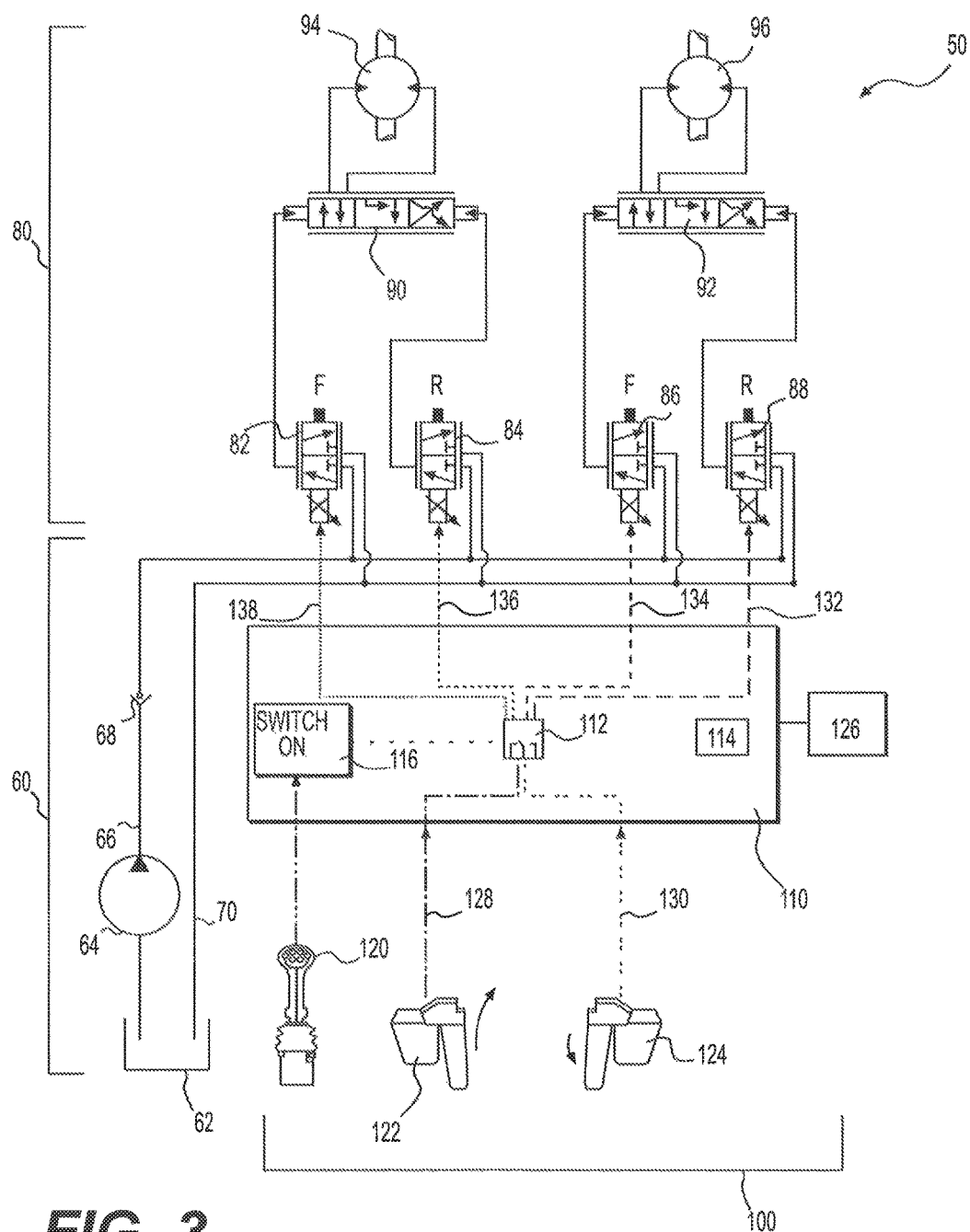
FIG. 3 is a schematic of another exemplary disclosed configuration of a control system for switching traction device inputs for the machine of FIG. 1.

FIG. 3 illustrates control system 50 according to an exemplary configuration in which switch 116 is "ON" (activated state). The components of control system 50 illustrated in FIG. 3 are similar to those illustrated in FIG. 2. Therefore, in the following disclosure, only differences in the operating characteristics of control system 50 based on the activated state of switch 116 are described.

As illustrated in FIG. 3, when switch 116 is "ON" (activated state), inputs to the first and second actuators 94, 96 and, therefore, of first and second traction devices 16 and 18 may be switched (i.e. reversed) relative to the configuration of FIG. 2. That is, first interface device 122 may be configured to control second traction device 18 and second interface device 124 may be configured to control first traction device 16. In this configuration, for example, cabin 20 may face second direction 38 (see FIG. 1), first traction device 16 may be located on the right side of an operator in cabin 20 and second traction device 18 may be located on the left side of the operator. Thus, for example, when first and second signals generated by first and second interface devices 122, 124 indicate that the operator desires to propel machine 10 in a forward direction, processor 112 may direct branch current 134 to solenoid valve 84 without energizing solenoid valve 82. Processor 112 may similarly direct branch current 138 to solenoid valve 88 without energizing solenoid valve 86. Upon receiving branch currents 134, 138, solenoid valves 84 and 88, respectively, may be configured to direct pressurized fluid to first and second actuators 94, 96, which may rotate in a second angular direction causing first and second traction devices 16, 18 to be propelled in second direction 38. One of ordinary skill in the art would recognize that in this configuration, although travelling in second direction 38, machine 10 would be moving in a forward direction relative to an operator located in cabin 20 because cabin 20 is facing second direction 38. Hydraulic fluid from first and second actuators 94, 96 may return to tank 64 via the de-energized solenoid valves 82, 86, respectively.

Further, in the configuration of FIG. 3, when first and second signals indicate that the operator desires to move machine 10 in a rearward direction, processor 112 may direct branch current 132 to solenoid valve 82 without energizing solenoid valve 84. Processor 112 may similarly direct branch current 136 to solenoid valve 86 without energizing solenoid valve 88. Upon receiving branch currents 132, 136, solenoid valves 82 and 86, respectively, may be configured to direct pressurized fluid to first and second actuators 94, 96, which may rotate in a first angular direction causing first and second traction devices 16, 18 to be propelled in first direction 36. One of ordinary skill in the art would recognize that in this configuration, although travelling in first direction 36, machine 10 would be moving in a rearward direction relative to an operator located in cabin 20 because cabin 20 is facing second direction 38. Hydraulic fluid from first and second actuators 94, 96 may return to tank 62 via de-energized solenoid valves 82, 86, respectively. One of ordinary skill in the art would recognize that additional components such as filters, valves, passageways, sensors, etc. may be implemented the configurations of FIGS. 2 and 3. One of ordinary skill in the art would also recognize that FIGS. 2 and 3 illustrate exemplary configurations and that the components illustrated in FIGS. 2 and 3 could be arrange in alternative configurations to achieve the same results as described with respect to FIGS. 2 and 3 above.

INDUSTRIAL APPLICABILITY

The disclosed control system may be applicable to any machine that includes an upper frame and a lower frame, wherein each of the upper and lower frames are independently rotatable with respect to one another. The disclosed control system may provide an intuitive control environment for an operator, irrespective of the orientation of the upper frame with respect to the lower frame. An exemplary operation of the disclosed system will now be explained.

Figure 4:
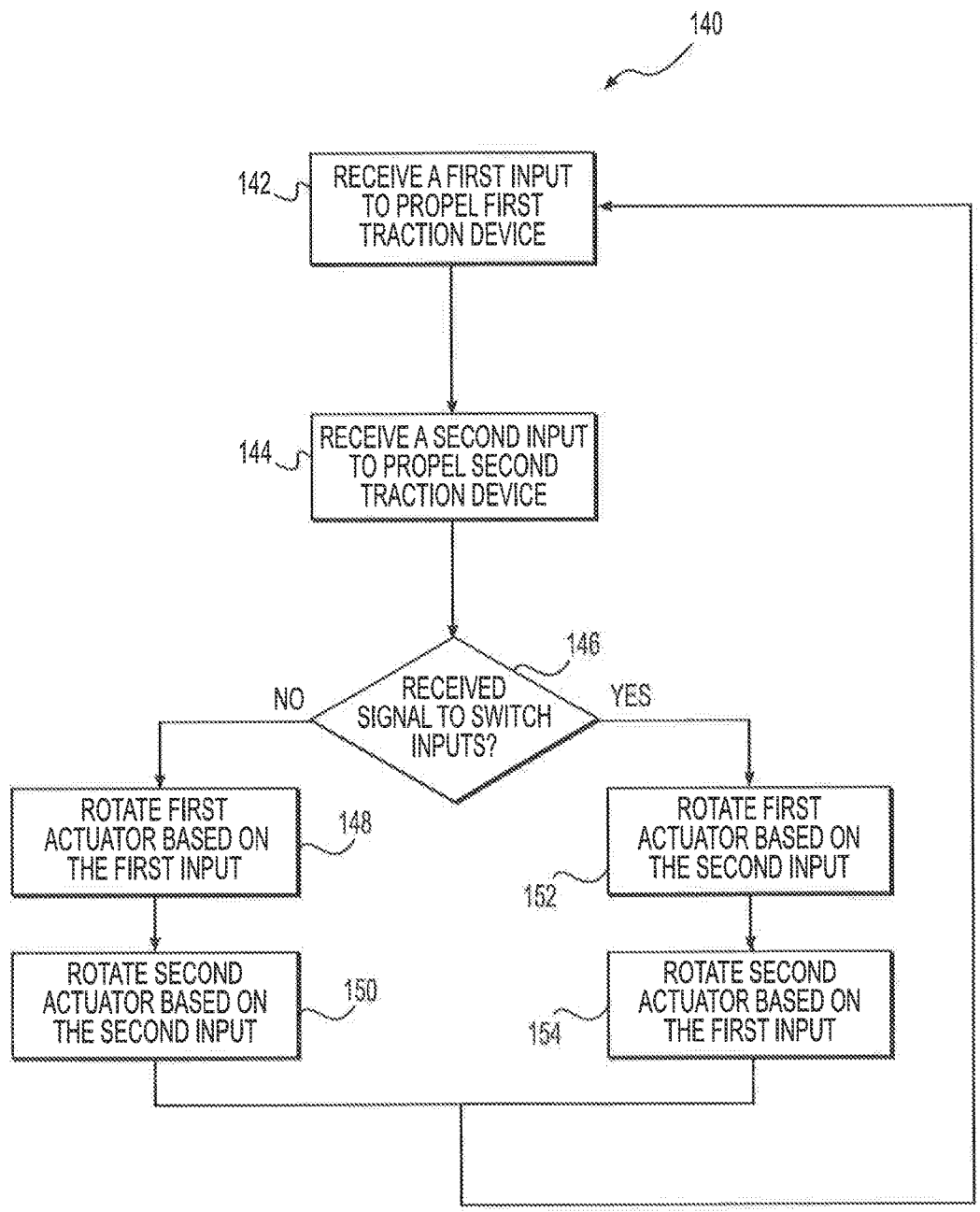
FIG. 4 is a flow chart illustrating an exemplary disclosed method of switching traction device inputs performed by the control system configurations of FIGS. 2 and 3.

FIG. 4 illustrates an exemplary disclosed method 140 of switching inputs to first and second traction devices 16, 18 of machine 10. As illustrated in FIG. 4, controller 110 may receive a first input to propel first traction device 16 (Step 142). Further, controller 110 may receive a second input to propel second traction device 18 (Step 144). Controller 110 may determine whether it has received a signal to switch inputs (Step 146). Controller 110 may receive a signal to switch inputs from switch 116, for example, when switch 116 is "ON." For example, an operator may actuate switch 116 from the "OFF" position to the "ON" position using selector 120 when cabin 20 has rotated more than about 90 degrees relative to first direction 36. In some exemplary embodiments, the signal to switch inputs may be generated automatically without operator intervention. For example, proximity sensor 126 may generate the signal to switch inputs when proximity sensor 126 detects that upper frame 14 has rotated relative to lower frame 12 by more than a threshold angle. In these exemplary embodiments, controller 110 may receive the signal to switch inputs from proximity sensor 126 without operator intervention.

When controller 110 determines that it has not received a signal to switch inputs (Step 146: NO), controller 110 may proceed to step 148 of rotating first actuator 94 based on the first input received from first interface device 122 (Step 148). Controller 110 may also rotate second actuator 96 based on the second input received from second interface device 124 (Step 150). Controller may return to step 142.

Returning to step 146, when controller 110 determines, however, that it has received a signal to switch inputs (Step 146: YES), controller 110 may proceed to step 152 of rotating the first actuator 94 based on the second input received from the second interface device 124 (Step 152). Controller 110 may also rotate the second actuator 96 based on the first input received from first interface device 122 (Step 154). Controller may return to step 142.

It will be apparent to those skilled in the art that various modifications and variations can be made to the disclosed control system for switching traction device inputs. Other embodiments will be apparent to those skilled in the art from consideration of the specification and practice of the disclosed control system for switching traction device inputs. It is intended that the specification and examples be considered as exemplary only, with a true scope being indicated by the following claims and their equivalents.

What is claimed is:

1. A control system for a machine having first and second traction devices and a cabin capable of rotating relative to the first and second traction devices, the control system comprising:
    a first actuator configured to drive the first traction device;
    a first valve configured to control a flow of actuating fluid to or from the first actuator;
    a first interface device configured to generate a first input indicative of a desired movement of the first actuator;
    a second actuator configured to drive the second traction device;
    a second valve configured to control a flow of actuating fluid to or from the second actuator;
    a second interface device configured to generate a second input indicative of a desired movement of the second actuator; and
    a controller in communication with the first and second actuators and the first and second interface devices, the controller being programmed to:
        energize the first valve and the second valve, respectively, responsive to the first input and the second input, to cause the first actuator to operate in accordance with the first input and the second actuator to operate in accordance with the second input when the cabin is facing a first direction; and
        energize the first valve and the second valve, respectively, responsive to the second input and the first input, to cause the first actuator to operate in accordance with the second input and the second actuator to operate in accordance with the first input when the cabin is facing a second direction.

2. The control system of claim 1, wherein the first direction is 180 degrees rotated from the second direction.

3. The control system of claim 1, wherein the first actuator is a first motor and the second actuator is a second motor.

4. The control system of claim 3, wherein the first motor and the second motor rotate in a first angular direction when the cabin faces the first direction and in a second angular direction opposite to the first angular direction when facing the second direction.

5. The control system of claim 3, wherein each of the first valve and the second valve includes at least one solenoid valve for controlling each of the first and second motors.

6. The control system of claim 1, wherein the controller is configured to:
    receive a signal to switch inputs from a selector; and
    operate the first and second actuators based on the signal.

7. The control system of claim 6, wherein the selector includes one of a switch, a joystick, and a lever.

8. The control system of claim 1, wherein the controller is configured to:
    receive a signal to switch inputs from a proximity sensor; and
    operate the first and second actuators based on the signal.

9. The control system of claim 8, wherein the proximity sensor is configured to generate the signal when the cabin rotates by a threshold angle relative to a direction collinear with the first direction.

10. The control system of claim 8, wherein the controller is further configured to inhibit the first and second actuators from responding to the first and second inputs, when a speed of the machine exceeds a threshold speed.

* * * * *